United States Patent [19]

Tamura et al.

[11] Patent Number: 5,751,083
[45] Date of Patent: May 12, 1998

[54] MAGNETIC SCREW CONVEYING APPARATUS

[75] Inventors: Akira Tamura; Osamichi Yamada; Tadashi Endo; Eiji Uematsu, all of Komaki, Japan

[73] Assignee: CKD Corporation, Japan

[21] Appl. No.: 781,844

[22] Filed: Jan. 10, 1997

[30] Foreign Application Priority Data

Jan. 15, 1996 [JP] Japan .................................. 8-021764
Jul. 26, 1996 [JP] Japan .................................. 8-197891

[51] Int. Cl.⁶ .................................................. H02K 7/06
[52] U.S. Cl. ................................................. 310/80; 74/89.15
[58] Field of Search ................................. 310/20, 80, 83, 310/17; 74/89.15, 424.8 R, 424.8 B

[56] References Cited

U.S. PATENT DOCUMENTS 5,015,936  5/1991  Inoue ............................ 318/135 X
5,611,508  3/1997  Palmero ......................... 248/123.2

FOREIGN PATENT DOCUMENTS 1-209222  8/1989  Japan .

Primary Examiner—Steven L. Stephan
Assistant Examiner—Judson H. Jones
Attorney, Agent, or Firm—Finnegan, Henderson, Farabow, Garrett & Dunner, L.L.P.

[57] ABSTRACT

A magnetic screw conveying apparatus comprises a rotary shaft 11 rotatably supported, a stepmother 19 for driving the rotary shaft 11 to rotate, a male magnetic screw 15 having magnetized bands with a south pole S and a north pole N alternately magnetized and in parallel to each other on the outer periphery of the rotary shaft, a first slide table 21 slidably mounted on the rotary shaft 11, a first female magnetic screw 27 having magnetized bands with a south pole S and a north pole N alternately magnetized in a spiral form at a first inclination angle θ1 on an inner periphery surface of the first slide table, opposite to the male magnetic screw, a second slide table 22 slidably mounted on the rotary shaft 11, and a second female magnetic screw 28 having magnetized bands with a south pole S and a north pole N alternately magnetized in a spiral form at a second inclination angle θ2 on an inner periphery surface of the second slide table, opposite to the male magnetic screw, wherein, with the rotation of the rotary shaft 11 by the step motor 19, the first and second female magnetic screws 27 and 28 receive magnetic force from the male magnetic screw 15 respectively, thereby allowing the first and second slide tables 21 and 22 to move at different speeds.

8 Claims, 12 Drawing Sheets

MAGNETIC SCREW CONVEYING APPARATUS

BACKGROUND OF THE INVENTION

1. Field of the Invention

The present invention relates to a magnetic screw conveying apparatus for converting rotary motion into linear motion by means of the operation of magnetic force generated between a male magnetic screw formed on an outer surface of a rotary shaft and a female magnetic screw formed on an inner peripheral surface of a slide table. More particularly, it relates to a magnetic screw conveying apparatus which comprises a male magnetic screw provided with a plurality of magnetized bands with a north and a south poles arranged alternately in parallel and male magnetic screws each provided with a plurality of magnetized bands with a north and a south poles arranged alternately in a spiral form at an inclination angle different between the female magnetic screws, thereby allowing the female magnetic screws at different speeds.

2. Description of Related Art

There have been proposed various types of magnetic screw conveying apparatus using a magnetic screw constructed of a male magnetic screw and a female magnetic screw both formed of magnets spirally magnetized and thereby converting rotary motion into linear motion.

An example of the magnetic screw in the prior art is described in Japanese Patent Application laid-open No. 1-209222. The structure thereof will be explained below in reference to FIG. 15.

A shaft 51 is rotatably supported in a couple of ball bearings 52 fixedly mounted on an installing member such as a frame and the like. On the outer peripheral surface of the shaft 51, magnetized bands 53 with a north pole N and a south pole S are winded alternately arranged in a spiral form, thus forming a male magnetic screw 71. On an end of the shaft 51 supported on the bearing 52, a pulley 154 is fixedly attached. A belt 55 is stretched over the pulley 54 and another pulley 57 of a motor 56.

A slide table 58, whose sectional view is shown in the drawing, is constructed so as to surround the male magnetic screw 71 and a guide bar 61 for preventing the slide table 58 from rotating during sliding motion. On the inner surface of a cylindrical hollow 59 of the slide table 58 are provided magnet bands 60 with a north pole N and a south pole S winded in a spiral form so that opposite poles are alternately arranged, thus forming a female magnetic screw 72.

In the cylindrical hollow 59, the male magnetic screw 71 is disposed with a space indicated by "a" in the drawing so that the magnets 53 and 60 are not contact each other.

In the magnetic screw conveying apparatus constructed as above, the rotation of the shaft 51 driven by the motor 56 causes magnetic force to function between the male and female magnetic screws 71 and 72, that is, the magnet 53 winded on the shaft 51 and the magnet 60 attached on the slide table 58. At this time, as the shaft 51 rotates, the slide table 58 moves linearly along the guide bar 61 by means of the magnetic force. In the meantime, if the motor 56 is driven to rotate reversely, opposite magnetic force works on between both magnets 53 and 60, allowing the slide table 58 to move back.

However, the ordinary magnetic conveying apparatus has the following disadvantage.

A moving apparatus in use for a lens system of copying machines, for example, is needed to move a plurality of lenses at various speeds. In the magnetic screw conveying apparatus, the moving speed of the slide table is determined based on the inclination angle of the magnetized bands formed on a male magnetic screw and a female magnetic screw respectively and the rotating speed of the male magnetic screw. Accordingly, if using the magnetic screw conveying apparatus for the moving apparatus of the lens system, it is demanded to provide a combination of a male magnetic and female screws for each lens constructing the lens system, needing a large space and thus causing the increase of cost.

SUMMARY OF THE INVENTION

The present invention has been made in view of the above circumstances and has an object to overcome the above problems and to provide a magnetic screw conveying apparatus capable of moving a plurality of slide tables at various speeds.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, (1) a magnetic screw conveying apparatus of this invention comprise a rotary shaft rotatably supported, driving means for driving the rotary shaft to rotate, a male magnetic screw having magnetized bands with a south pole S and a north pole N alternately magnetized and in parallel to each other on the outer periphery of the rotary shaft, a first slide table slidably mounted on the rotary shaft, a first female magnetic screw having magnetized bands with a south pole S and a north pole N alternately magnetized in a spiral form at a first inclination angle on an inner periphery surface of the first slide table, opposite to the male magnetic screw, a second slide table slidably mounted on the rotary shaft, and a second female magnetic screw having magnetized bands with a south pole S and a north pole N alternately magnetized in a spiral form at a second inclination angle on an inner periphery surface of the second slide table, opposite to the male magnetic screw, wherein, with the rotation of the rotary shaft by the driving means, the first and second female magnetic screws receive magnetic force from the male magnetic screw respectively, thereby allowing the first and second slide tables to move at different speeds.

(2) In the magnetic screw conveying apparatus (1), the male magnetic screw may comprise magnetized bands formed in parallel to an axis thereof.

(3) In the magnetic screw conveying apparatus (1), the male magnetic screw may comprise magnetized formed in parallel to a circumference thereof.

(4) In one of the magnetic screw conveying apparatus (1) through (3), the first and second inclination angles may be set in different directions with respect to a circumference, when the first and second slide tables move in opposite directions when the rotary shaft is rotated.

In the above description (1), the expression "at different speeds" comprises "at the same speed in opposite directions".

(5) The magnetic screw conveying apparatus (1) may further comprise a double male magnetic screw having first spiral magnetized bands with a south pole S and a north pole N alternately magnetized at a first inclination angle on the rotary shaft and second magnetized bands with a south pole S and a north pole N alternately magnetized at a second inclination angle on the same.

(6) In the magnetic screw conveying apparatus (5), the first inclination angle of the first female magnetic screw and the second inclination angle of the second female magnetic screw may be set in different directions with respect to the circumference, and the first and second inclination angles of the double male magnetic screw may be set in different directions with respect to the circumference, when the first and second slide tables move in opposite directions when the rotary shaft is rotated.

The above constructed magnetic screw conveying apparatus has the following operation.

For example, in the magnetic screw conveying apparatus (2), when the rotary shaft and the male magnetic screw are rotated by driving means, the first female magnetic screw receives magnetic force from the male magnetic screw, so that the first slide table is moved. The speed at which the first slide table is moved is based on the first inclination angle. Similarly, the second female magnetic screw receives magnetic force from the male magnetic screw, so that the second slide table is moved at a speed according to the second inclination angle. Here, if the first and second inclination angles are set to be different angles, a plurality of slide tables can be moved at different speeds when the male magnetic screw is rotated. It is also possible to stop a plurality of slide tables at any arbitrary positions.

In the above apparatus, the male magnetic screw has magnetized bands arranged in parallel to an axis of the rotary shaft, so that the female magnetic screws receive less magnetic force than the magnetic force generated between the ordinary male magnetic screw provided with spiral magnetized bands with the same inclination angle as that of the female magnetic screw. Accordingly, it appears improper in a case of needing a high transmitting power, whereas it enables to build a compact conveying apparatus in use for conveying light objects.

In the case that the first and second inclination angles have different directions about the tangent line of a circumference of each female magnetic screw, e.g., the first inclination angle is set to 45° to the right and the second inclination angle is set to 45° to the left, the first and second female magnetic screws receive magnetic force in opposite directions when the male magnetic screw is rotated, thereby moving the first and second slide tables in opposite directions and at the same speed.

In the magnetic screw conveying apparatus (5), the male magnetic screw is double magnetized, so that the first female magnetic screw receives the magnetic force from the male magnetic screw having spiral magnetized bands with the first inclination angle, thereby moving the first slide table. At the same time, the second female magnetic screw receives the magnetic force from the male magnetic screw having spiral magnetized bands with the second inclination angle, thereby moving the second slide table.

At this time, the first female magnetic screw is also influenced by the magnetized bands with the second inclination angle of the male magnetic screw, and the second female magnetic screw is also influenced by the magnetized bands with the first inclination angle. As a result, the first and second female magnetic screws receive less magnetic force than each female magnetic screw should naturally receive. It therefore appears inappropriate for the case of needing a high transmitting force, whereas it can make a compact conveying apparatus in use for conveying light objects.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
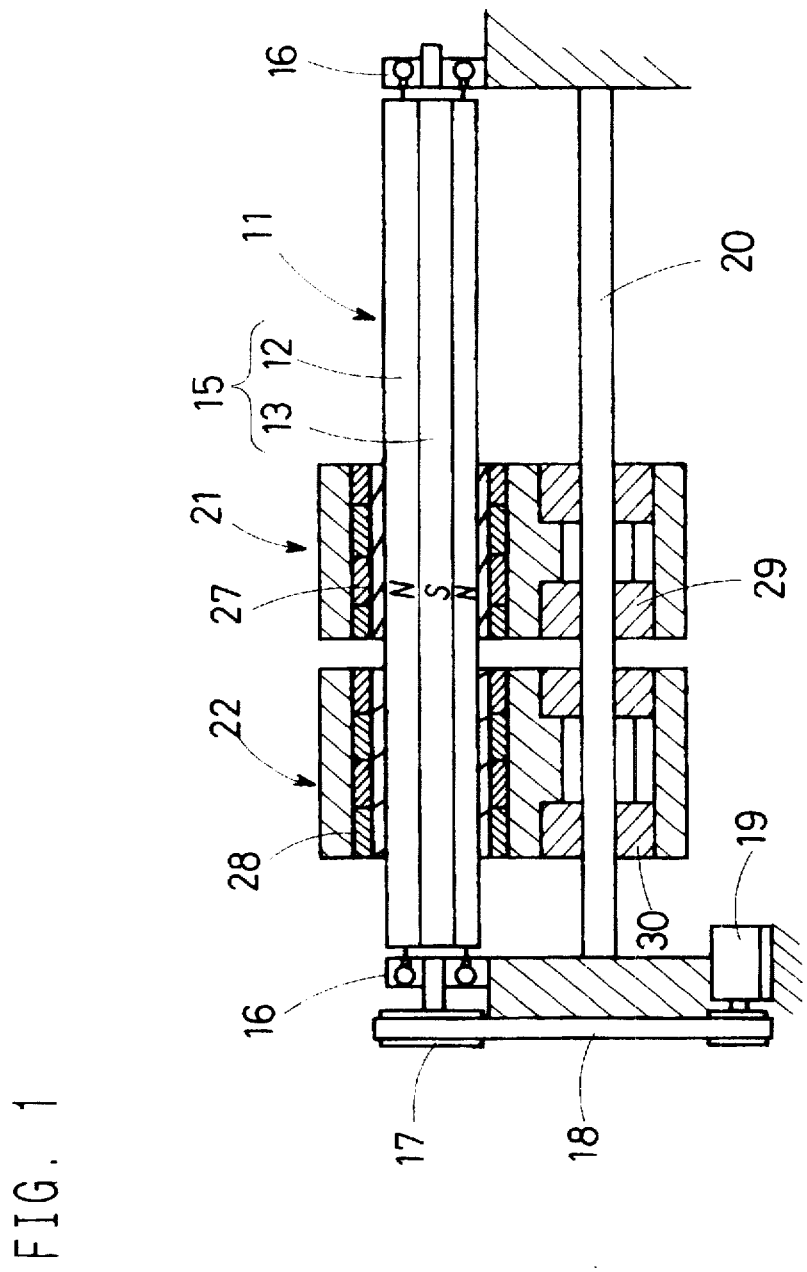
FIG. 1 is a sectional view of a magnetic screw conveying apparatus in a first embodiment of the present invention.

A detailed description of preferred embodiments of a magnetic screw conveying apparatus embodying the present invention will now be given referring to the accompanying drawings. FIG. 1 is a sectional view of a magnetic screw conveying apparatus in a first embodiment.

The magnetic screw conveying apparatus in the embodiment is mainly provided with a rotary shaft 11 horizontally disposed, two slide tables 21 and 22 mounted on the rotary shaft 11 so as to be slidably to the left and right in the drawing.

At first, the rotary shaft 11 will be described. This rotary shaft 11 is rotatably supported on a couple of bearings 16, 16. On the left end of the rotary shaft 11 is fixedly attached a pulley 17. On the entire outer periphery of the rotary shaft 11, magnetized bands 13 with a south pole S and magnetized bands 12 with a north pole N are integrally formed alternately, in parallel to the axis of the rotary shaft 11. These magnetized bands 12 and 13 construct a male magnetic screw 15.

The pulley 17 is connected through a belt 18 with a stepmotor 19 for driving the rotary shaft 11.

The first conveying slide table 21 slidably mounted on the rotary shaft 11 has a first female magnetic screw 27 integrally on the inner periphery of a cylindrical hollow opposite to the male magnetic screw 15. Similarly, the second slide table 22 has a second female magnetic screw 28 integrally on the inner periphery of a cylindrical hollow opposite to the male magnetic screw 15. Between the male magnetic screw 15 and each of the first female magnetic screw 27 and the second female magnetic screw 28 is provided a predetermined space to prevent the contact of the male magnetic screw 15 with the female magnetic screws 27 and 28 respectively.

A guide bar 20 is fixedly installed in parallel with the rotary shaft 11. The first slide table 21 is slidably fitted through a slide member 29 on the guide bar 20 and the second slide table 22 is slidably fitted through a slide member 30 on the guide bar 20; thus, both slide tables 21 and 22 are slidably mounted on the rotary shaft 11 without rotating around the rotary shaft 11.

Figure 2:
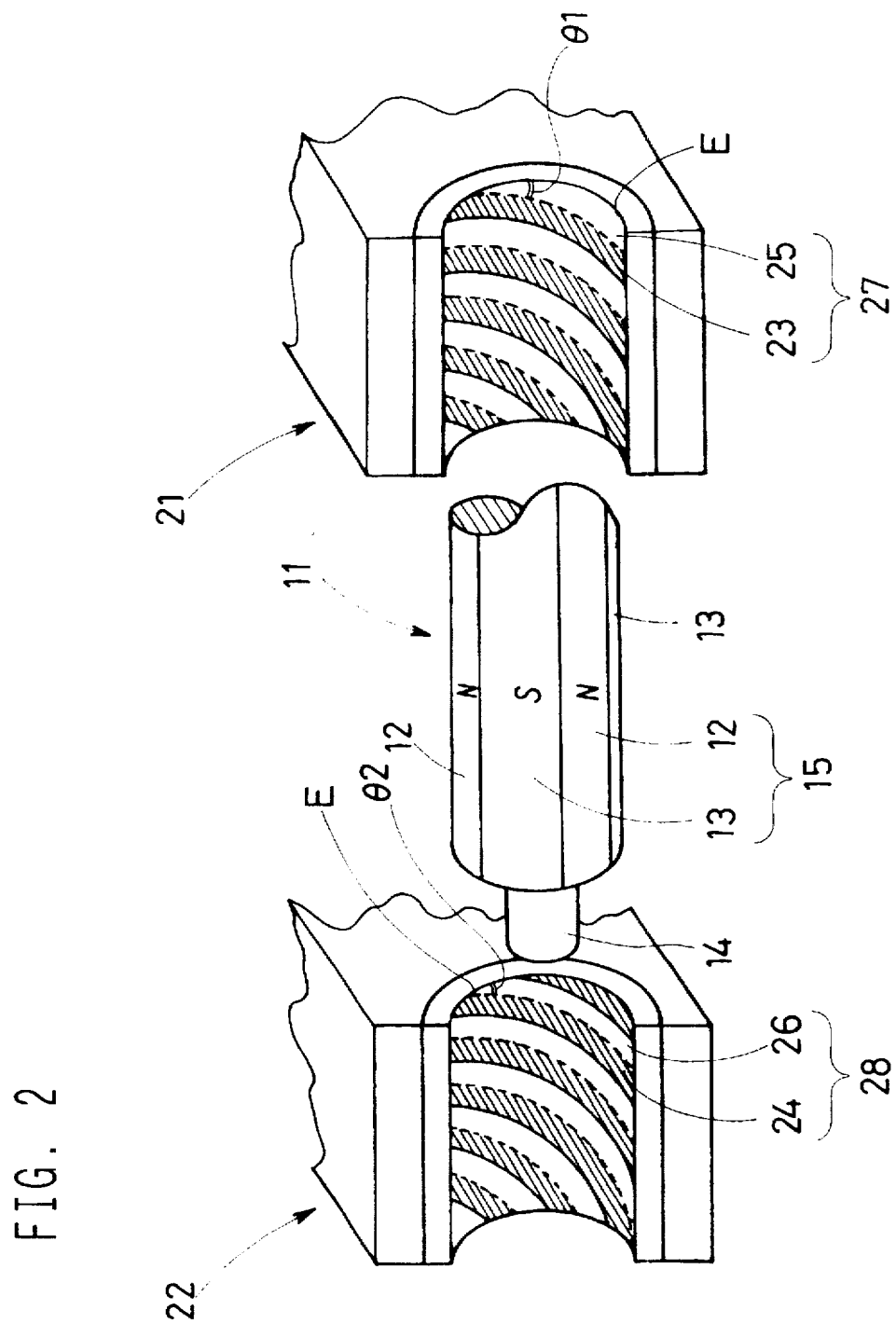
FIG. 2 is a schematically perspective view of a construction of a male magnetic screw 15, a first female magnetic screw 27, and a second female magnetic screw 28.

The male magnetic screw 15 constructing the rotary shaft 11 will be explained below. FIG. 2 is a schematic view of explaining each construction of the male magnetic screw 15, the first female magnetic screw 27, and the second female magnetic screw 28.

The male magnetic screw 15 is formed of a magnet having a plurality of magnetized bands with a south pole and a north pole alternately arranged and is provided on the entire outer periphery of a rod 14 to construct the rotary shaft 11. The rod 14 is formed of a high-permeability magnetic material (e.g., iron, iron oxide, nickel, cobalt, or an alloy made of these materials as main constituents, and other compounds) in order to increase the generation density of line of magnetic force.

The magnetized bands 12 and 13 are alternately arranged in parallel to the axis of the rod 14 so that contiguous magnetized bands have opposite polarities, covering the entire outer periphery of the rod 14.

Next, the first and second female magnetic screws 27 and 28 will be explained.

As shown in FIG. 2, the first female magnetic screw 27 is constructed of first magnetized bands 25 with a south pole S and second magnetized bands 23 with a north pole N, and both magnetized bands 23 and 25 are formed in parallel to each other and spirally at a first inclination angle θ1 to a circumference E of the first female magnetic screw 27. These first and second magnetized bands 23 and 25 are alternately arranged.

The second female magnetic screw 28 is constructed of first spiral magnetized bands 26 with a south pole S and second spiral magnetized bands 24 with a north pole N, and both magnetized bands 24 and 26 are formed in parallel to each other and spirally at a second inclination angle θ2 to the circumference E, and arranged alternately.

The first inclination angle θ1 and the second inclination angle θ2 are designed to be different, e.g., in the present embodiment, the first inclination angle is set to 45° and the second inclination angle is set to 30° in the same inclination direction.

Next, operation of the magnetic screw conveying apparatus constructed above will hereinafter be explained.

Figure 3:
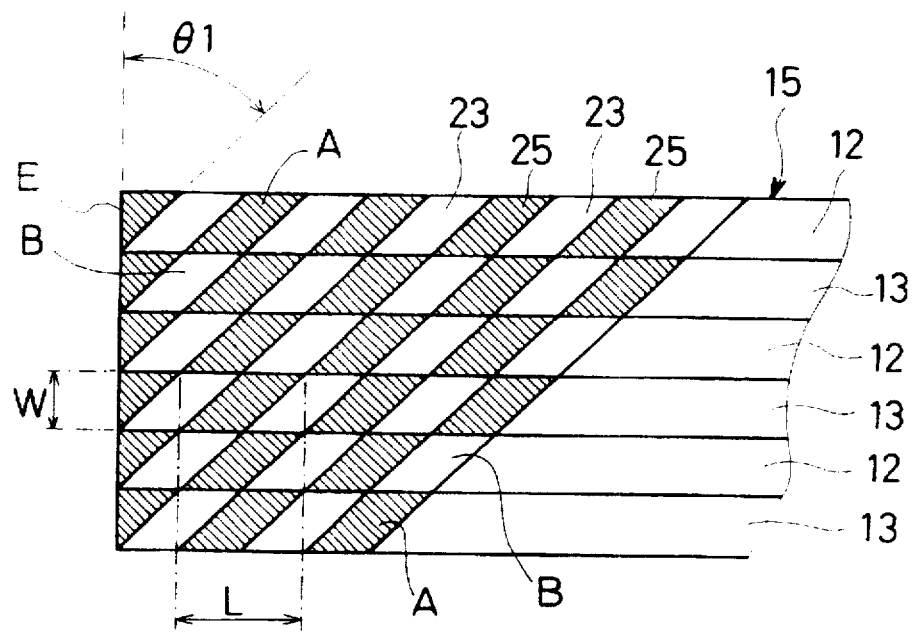
FIG. 3 is a schematic explanatory view of showing a magnetic relation between the first female magnetic screw 27 and the male magnetic screw 15.

FIG. 3 is an explanatory view of a magnetic relation between the first female magnetic screw 27 and the male magnetic screw 15. In the drawing, for convenience to explain the relation, the magnetized bands of the female magnetic screw 27 are superposed on those of the male magnetic screw 15.

The male magnetic screw 15, as mentioned above, is constructed of the magnetized bands 13 with a south pole S and the magnetized bands 12 with a north pole N, arranged in parallel to the axis of the rod 14 and alternately so that adjacent magnetized bands have opposite poles. The first female magnetic screw 27 is constructed of the first spiral magnetized bands 25 with a south pole S and the second spiral magnetized bands 23 with a north pole N, both magnetized bands 25 and 23 are formed alternately, in parallel to each other, and at an inclination angle θ1=45° with respect to a tangent of the circumference E.

The part A indicated by oblique lines in FIG. 3 represents the part where the magnetized bands of the male magnetic screw 15 and the first female magnetic screw 27 have opposite poles, thus attracting each other at that part. On the other hand, the part B without oblique lines represents the male magnetic screw 15 and the first female magnetic screw 27 has the like magnetic poles, thereby repelling each other.

The area of the attracting part A is substantially equal to that of the repelling part B, but the attracting force of permanent magnet is extremely stronger than the repelling force thereof. Accordingly, with the rotating of the rotary shaft 11, the female magnetic screw 27 is attracted by the male magnetic screw 15, allowing the first slide table 21 to move.

Even if the rotary shaft 11 is rotated at a constant speed, changing the inclination angle of the magnetized bands in the male magnetic screw 15 makes it possible to move the slide table at an arbitrary speed.

In detail, when the male magnetic screw 15 is rotated by a predetermined amount, e.g., the amount W in the drawing, the first female magnetic screw 27 moves by a distance corresponding to a length L of the attracting part B. Accordingly, as the inclination angle θ1 of the magnetized bands 23 and 25 of the first female magnetic screw 27 becomes larger, the length L becomes longer, so that the moving amount of the first female magnetic screw 27, i.e., the slide table increases.

Figure 5:
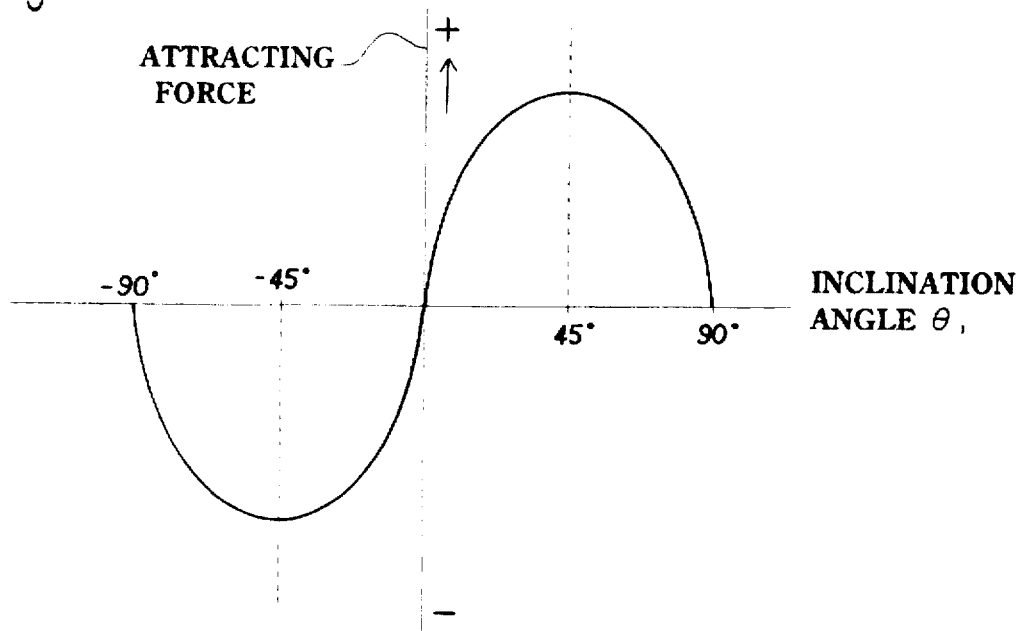
FIG. 5 is a graph to explain a relation between the inclination angle and attracting force.

FIG. 5 is a graph showing the relation between the inclination angle of the magnetized bands of the first female magnetic screw and the attracting force between the first female magnetic screw and the male magnetic screw.

In the graph, a horizontal axis indicates an inclination angle θ1 and a vertical axis indicates the strength of attracting force functioning between the male magnetic screw 15 and the first female magnetic screw 27. The attracting force in an upper side of the graph is represented as a positive force and a lower side is as a negative force.

As shown in FIG. 5, the attracting force becomes substantially maximum at the inclination angle of about 45°. In a case of needing a strong conveying force, therefore, the inclination angle of the magnetized bands of the male magnetic screw 15 is designed to be 45°.

Figure 4:
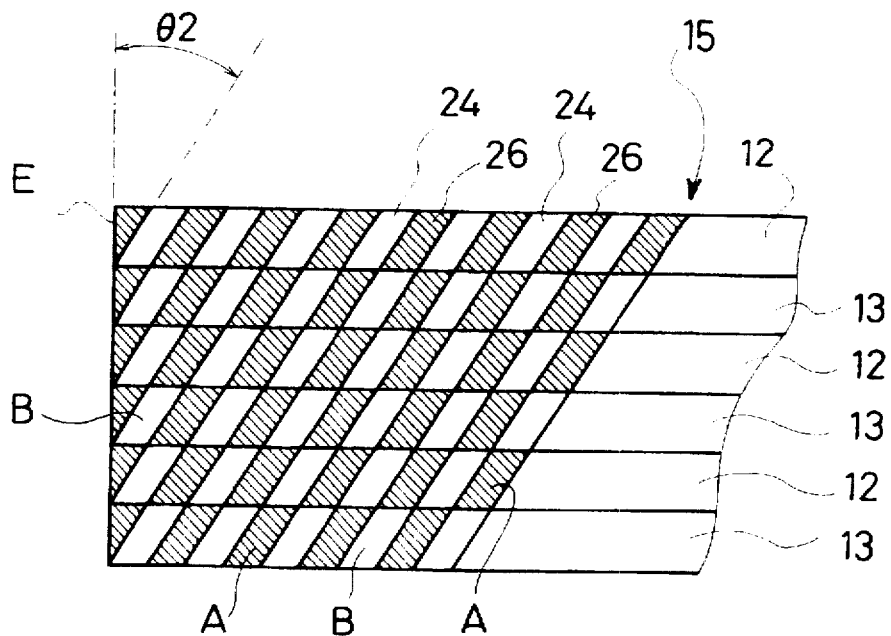
FIG. 4 is a schematic explanatory view of showing a magnetic relation between the second female magnetic screw 28 and the male magnetic screw 15.

FIG. 4 is an explanatory view of showing a magnetic relation between the second female magnetic screw 28 and the male magnetic screw 15 by superposing the spiral magnetized bands of the second female magnetic screw 28 on the parallel magnetized bands of the male magnetic screw 15.

The male magnetic screw 15 is, as mentioned above, constructed of parallel magnetized bands 13 and 12 with a south pole S and a north pole N arranged alternately.

In the meantime, the second female magnetic screw 28 is formed of the first magnetized bands 26 with a south pole S and the second magnetized bands 24 with a north pole N alternately arranged. Both magnetized bands 26 and 24 are arranged in parallel to each other, and at an inclination angle $\theta 2 = 30°$ with respect to the tangent of the circumference E.

The part A indicated by oblique lines in FIG. 4 represents the part where the magnetized bands of the male magnetic screw 15 the second female magnetic screw 28 have opposite poles, thus attracting each other at that part A. On the other hand, the part B without oblique lines represents the male magnetic screw 15 and the second female magnetic screw 28 have the like magnetic poles, thereby repelling each other.

The area of the attracting part A is substantially equal to that of the repelling part B, but the attracting force of permanent magnet is extremely stronger than the repelling force thereof. Accordingly, when the rotary shaft 11 is rotated, the female magnetic screw 28 is attracted by the male magnetic screw 15, thereby moving the second slide table 22. At this time, the second inclination angle $\theta 2$ is different from the first inclination angle $\theta 1$, so that the first and second slide tables 21 and 22 are allowed to move at different speeds.

Some using examples of the magnetic screw conveying apparatus mentioned above will be described in the following.

Figure 6:
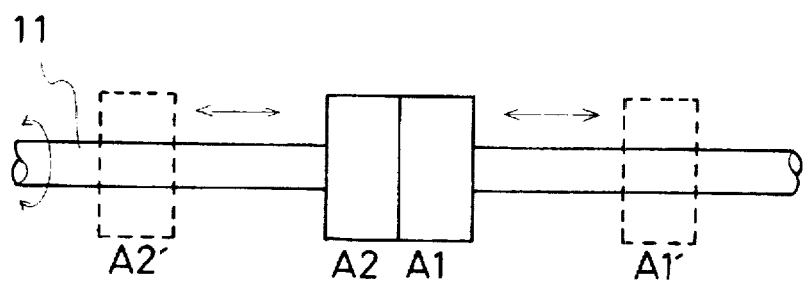
FIG. 6 is a first using example of the magnetic screw conveying apparatus.

FIG. 6 shows a first example, in which the first and second inclination angles are designed in opposite directions with respect to a tangent of the circumference E, e.g., the first inclination angle is 45° to the right and the second inclination angle is 45° to the left. In the drawing, reference numbers A1 and A2 illustrated by solid lines represent respective positions of the first and second slide tables 21 and 22 before the rotary shaft 11 rotates. When the rotary shaft 11 is rotated, the first slide table 21 is moved rightward from the position A1 to the position A1' illustrated by a dotted line. On the other hand, the second slide table 22 is moved leftward from the position A2 to the position A2'.

The inclination angles of the first and second female magnetic screws 27 and 28 are the same absolute values in opposite directions with respect to the circumference, thus allowing the first and second tables 21 and 22 to move by the same distance.

Figure 7:
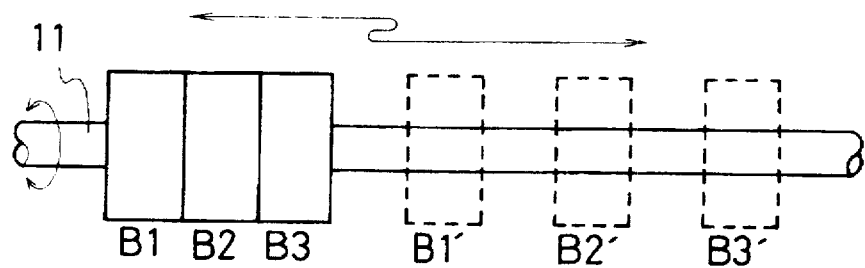
FIG. 7 is a second using example of the magnetic screw conveying apparatus.

FIG. 7 shows a second using example, in which the magnetized bands of the female magnetic screws provided at different angles and in the same direction. Reference numbers B1, B2, and B3 illustrated by solid lines represent positions of a first, second, and third slide tables before the rotary shaft 11 rotates. With the rotation of the rotary shaft 11, the first slide table is moved rightward from the position B1 to a position B1' illustrated by a dotted line. At the same time, the second slide table is moved rightward more than the first slide table and comes to a position B2', and also the third slide table is moved rightward more largely than the second slide table and comes to a position B3'.

Figure 8:
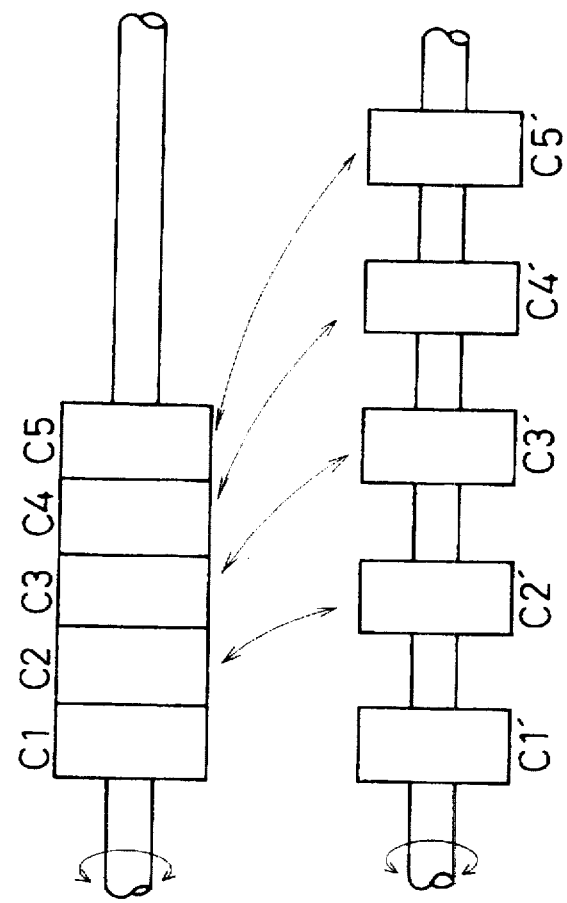
FIGS. 8(a) and 8(b) are a third using example of the magnetic screw conveying apparatus.

A third using example is shown in FIGS. 8(a) and (b), in which reference numbers C1–C5 in FIG. 8(a) represent respective positions of a first through fifth slide tables before the rotary shaft 11 rotates.

In this example, the magnetized bands of the above five slide tables have different inclination angles, among which the inclination angle of the first slide table is set into 0° or 90°. Even if the rotary shaft 11 is rotated, accordingly, the first slide table locating at a position C1 is stabilized at rest. With the rotation of the rotary shaft 11, the second slide table is moved rightward from a position C2 to a position C2', the third slide table is moved more rightward than the second slide table from the position C3 to a position C3'. Similarly, the fourth slide table is moved rightward more largely than the third slide table and comes to a position C4', and the fifth slide table is moved and comes to a position C5'.

As a result, the first through fifth slide tables are positioned at the positions C1' through C5' respectively at equal spaces. This arrangement can preferably be used for a packing process to separate components firmly disposed in a line at equal spaces to pack them in each case.

As described above, the magnetic screw conveying apparatus in the present embodiment comprises the rotary shaft 11 rotatably supported, the stepmotor 19 for supplying rotating force to the rotary shaft 11, the male magnetic screw 15 formed on the outer periphery of the rotary shaft 11 so that the magnetized bands with a south pole S and a north pole N are arranged alternately and in parallel to the axis, the first slide table 21 slidably mounted on the rotary shaft 11, the first female magnetic screw 27 having spiral magnetized bands with a south pole S and a north pole N alternately arranged, formed at the first inclination angle $\theta 1$ on the inner periphery opposite to the male magnetic screw 15, the second slide table slidably mounted on the rotary shaft 11, and the second female magnetic screw 28 having spiral magnetized bands with a south pole S and a north pole N alternately arranged, formed at the second inclination angle $\theta 2$ on the inner periphery opposite to the male magnetic screw 15. With the rotation of the rotary shaft 11, the first and second female magnetic screws 27 and 28 respectively receive the magnetic force from the male magnetic screw 15, thereby allowing the first and second slide tables 21 and 22 to move at different speeds. Accordingly, a plurality of slide tables can be moved to each arbitrary position with a male magnetic screw, making it possible to built a compact conveying apparatus and to reduce the cost.

Next, a second embodiment of the present invention will be explained hereinafter. A difference of the second embodiment from the first embodiment lies in only the construction of the male magnetic screw; therefore, only the different construction will be described. It should be noted that elements having the same functions as those of the first embodiment are designated by the same reference numerals.

Figure 9:
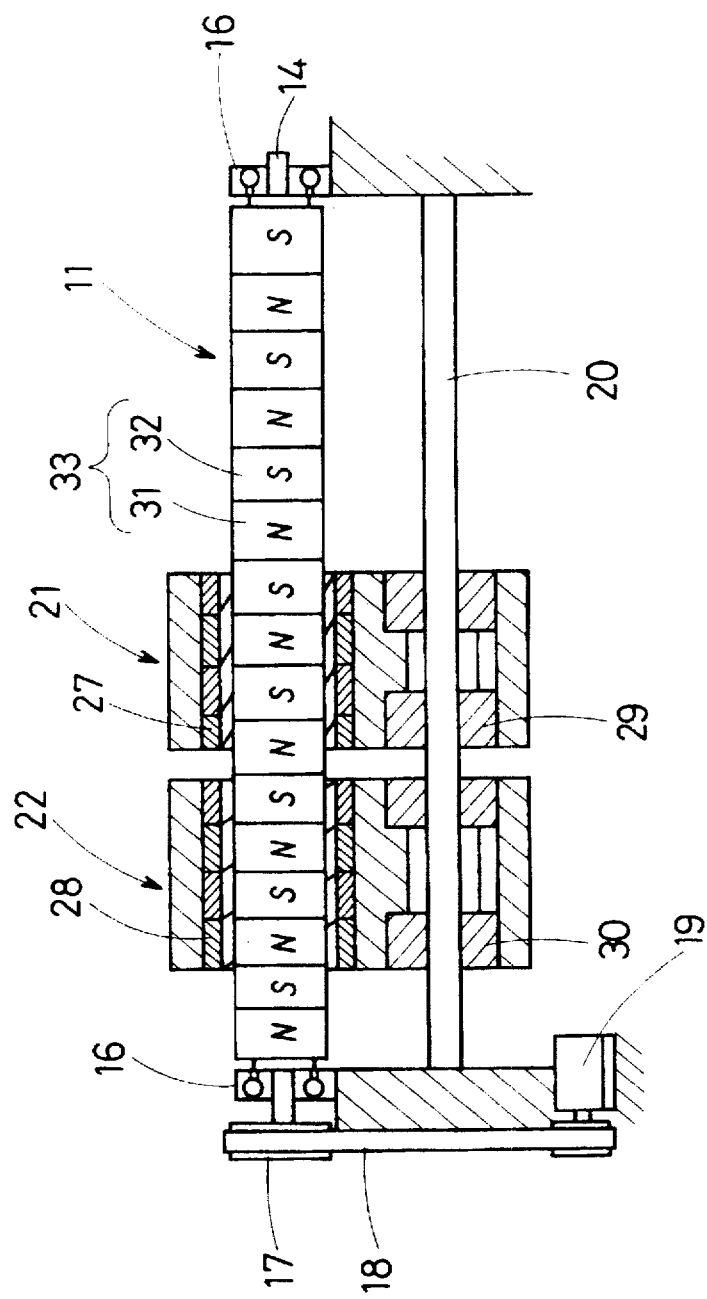
FIG. 9 is a sectional view of a magnetic screw conveying apparatus in a second embodiment of the present invention.
Figure 10:
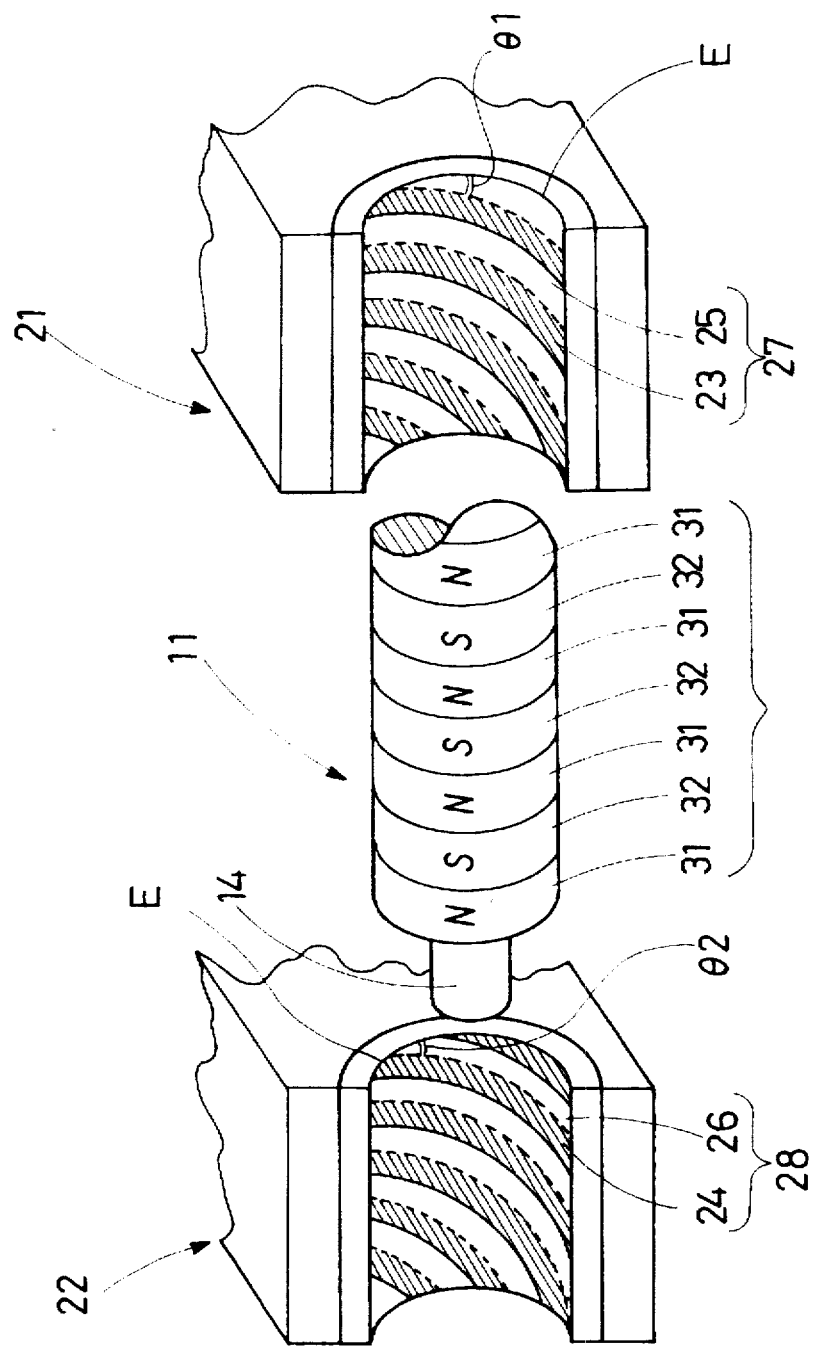
FIG. 10 is a schematically perspective view of a construction of a male magnetic screw 33, a first female magnetic screw 27, and a second female magnetic screw 28.

As shown in FIGS. 9 and 10, a male magnetic screw 33 is constructed of magnetized bands 31 with a north pole N and magnetized bands 32 with a south pole S, both magnetized bands 31 and 32 are arranged alternately and in parallel with a circumference of the rod 14. The magnetized bands 31 and 32 have an equal width. The first and second female magnetic screws 27 and 28 have the same constructions as in the first embodiment.

Next, the operation of the magnetic screw conveying apparatus constructed above in the second embodiment will be described.

Figure 11:
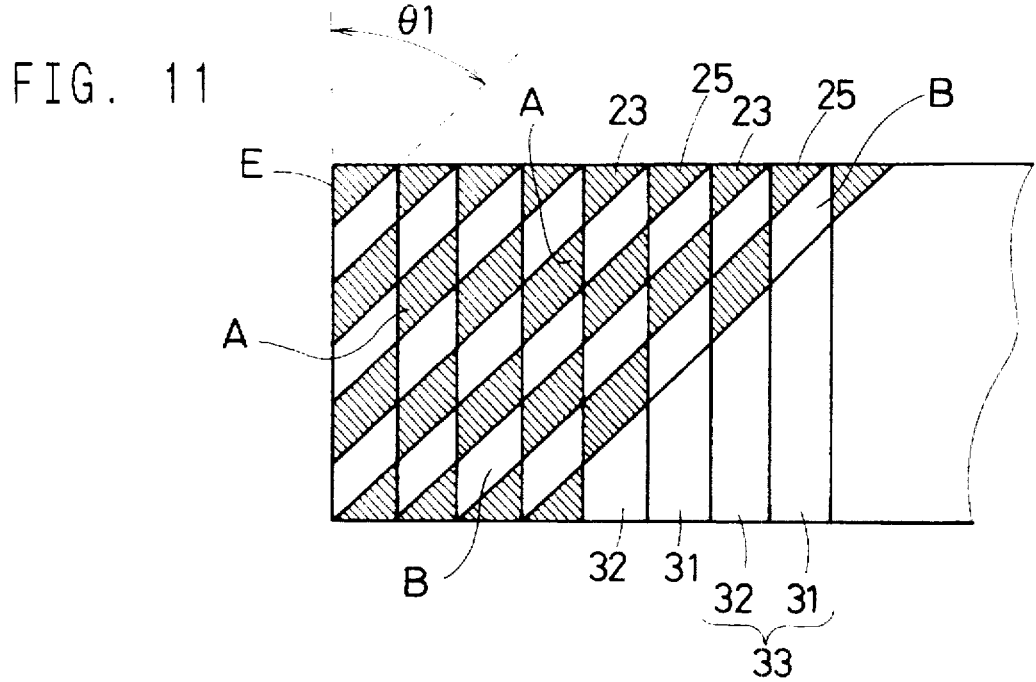
FIG. 11 is a schematic explanatory view of showing a magnetic relation between the first female magnetic screw 27 and the male magnetic screw 33.

FIG. 11 shows a magnetic relation between the first female magnetic screw 27 and the male magnetic screw 33, in which for convenience to explain the relation, the magnetized bands of the female magnetic screw 27 are superposed on those of the male magnetic screw 33.

The male magnetic screw 33, as mentioned above, is constructed of magnetized bands 31 and 32 with a north pole N and a south pole S arranged alternately and in parallel to the circumference. The first female magnetic screw 27 is constructed of the first magnetized bands 25 with a south pole S and the second magnetized bands 23 with a north pole N, both magnetized bands 25 and 23 are arranged alternately, in parallel to each other, and at an inclination angle $\theta 1=45°$ with respect to a tangent of the circumference E.

The part A indicated by oblique lines in FIG. 11 represents the area where the magnetized band of the male magnetic screw 33 and the first female magnetic screw 27 have opposite poles, thus, attracting each other at that part A. On the other hand, the part B without oblique lines represents, the male magnetic screw 33 and the first female magnetic screw 27 have the like magnetic poles, thereby repelling each other.

The area of the attracting part A is substantially equal to that of the repelling part B, whereas the attracting force of permanent magnet is extremely stronger than the repelling force thereof. Accordingly, with the rotating of the rotary shaft 11, the first female magnetic screw 27 is attracted by the male magnetic screw 33, so that the first slide table 21 is moved.

Even if the rotary shaft 11 is rotated at a constant speed, as mentioned above, changing the first inclination angle $\theta 1$ makes it possible to move the first slide table 21 at any arbitrary speed.

Figure 12:
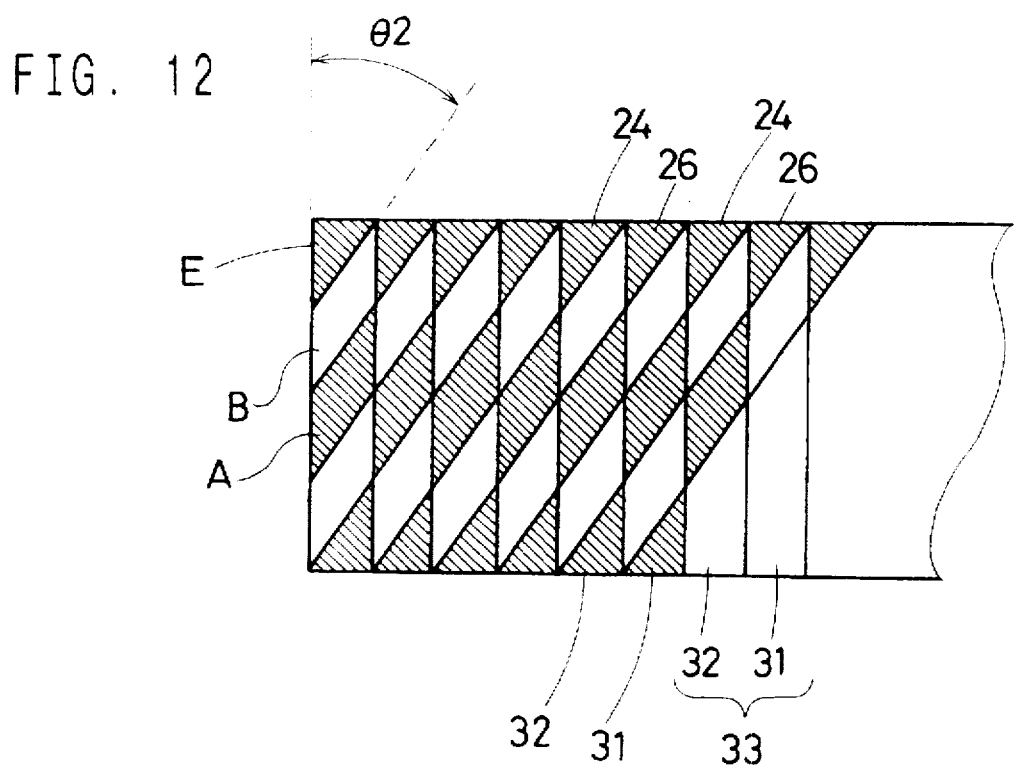
FIG. 12 is a schematic explanatory view of showing a magnetic relation between the second female magnetic screw 28 and the male magnetic screw 33.

FIG. 12 shows a magnetic relation between the second female magnetic screw 28 and the male magnetic screw 33, in which the spiral magnetized bands of the second female magnetic screw 28 is superposed on the parallel magnetized bands of the male magnetic screw 33.

The male magnetic screw 33 is, as mentioned above, constructed of magnetized bands 32 and 31 with a south pole S and a north pole N arranged alternately and in parallel to the circumference. In the meantime, the second female magnetic screw 28 is constructed of the first magnetized bands 26 with a south pole S and the second magnetized bands 24 with a north pole N, both magnetized bands 26 and 24 are arranged alternately, in parallel to each other, and at an inclination angle $\theta 1=30°$ with respect to the tangent of the circumference E.

The part A indicated by oblique lines in FIG. 12 represents the area where the magnetized band of the male magnetic screw 33 and the second female magnetic screw 28 have opposite poles; accordingly, the male magnetic screw 33 and the second female magnetic screw 28 attract each other at that part A. On the other hand, the part B without oblique lines represents the male magnetic screw 33 and the second female magnetic screw 28 have like magnetic poles, thereby repelling each other.

The area of the attracting part A is substantially equal to that of the repelling part B, whereas the attracting force of permanent magnet is extremely stronger than the repelling force thereof. Accordingly, when the rotary shaft 11 is rotated, the female magnetic screw 28 is attracted by the male magnetic screw 15, thereby moving the second slide table 22.

At this time, the second inclination angle $\theta 2$ is different from the first inclination angle $\theta 1$, so that the first and second slide tables 21 and 22 move at different speeds.

As clearly described above, the magnetic screw conveying apparatus in the second embodiment comprises the rotary shaft 11 rotatably supported, the step motor 19 for supplying rotating force to the rotary shaft 11, the male magnetic screw 33 having magnetized bands with a south pole S and a north pole N alternately arranged, the magnetized bands being formed in parallel to the circumference on the outer periphery of the rotary shaft 11, the first slide table 21 slidably mounted on the rotary shaft 11, the first female magnetic screw 27 having spiral magnetized bands with a south pole S and a north pole N alternately arranged, formed at the first inclination angle $\theta 1$ on the inner periphery opposite to the male magnetic screw 33, the second slide table slidably mounted on the rotary shaft 11, and the second female magnetic screw 28 having spiral magnetized bands with a south pole S and a north pole N arranged alternately, formed at the second inclination angle $\theta 2$ on the inner periphery opposite to the male magnetic screw 33. With the rotation of the rotary shaft 11, the first and second female magnetic screws 27 and 28 respectively receive the magnetic force from the male magnetic screw 33, so that the first and second slide tables 21 and 22 are moved at different speeds. Accordingly, a plurality of slide tables can be moved to each arbitrary position by means of a male magnetic screw, making it possible to built a compact conveying apparatus and to reduce the cost.

Next, a third embodiment of the present invention will be described hereinafter. A difference of the third embodiment from the first embodiment lies in only the construction of the male magnetic screw; therefore, only the different construction will be described. It should be noted that elements having the same functions as those of the first embodiment are designated by the same reference numerals.

Figure 13:
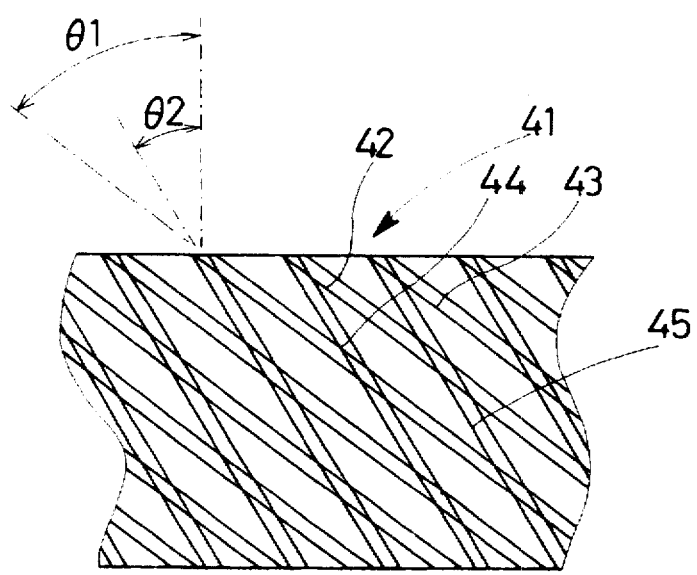
FIG. 13 is a schematic explanatory view of showing a construction of a male double magnetic screw 41 in a third embodiment of the present invention.

As shown in FIG. 13, a male magnetic screw 41 is provided with double magnetized bands.

Figure 14:
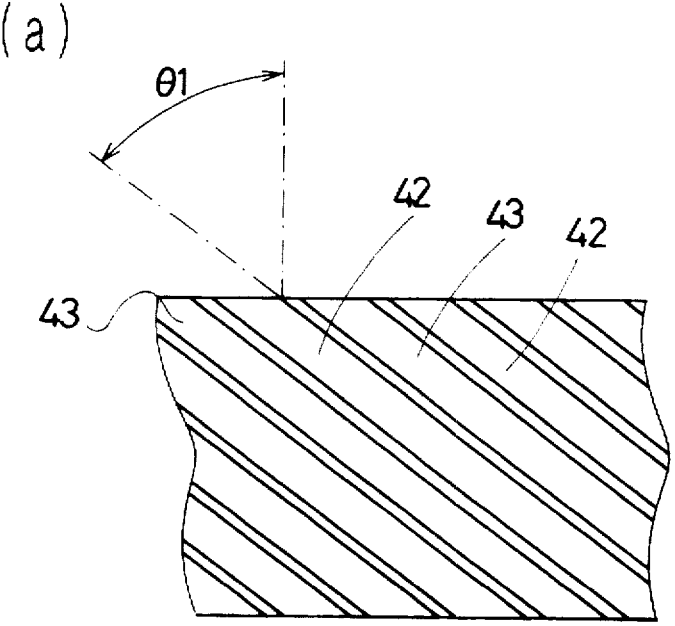
FIG. 14(a) is a schematic explanatory view of showing the magnetized bands with the first inclination angle in the male double magnetic screw 41.
FIG. 14(b) is a schematic explanatory view of showing the magnetized bands with the second inclination angle in the male double magnetic screw 41.
Figure 14:
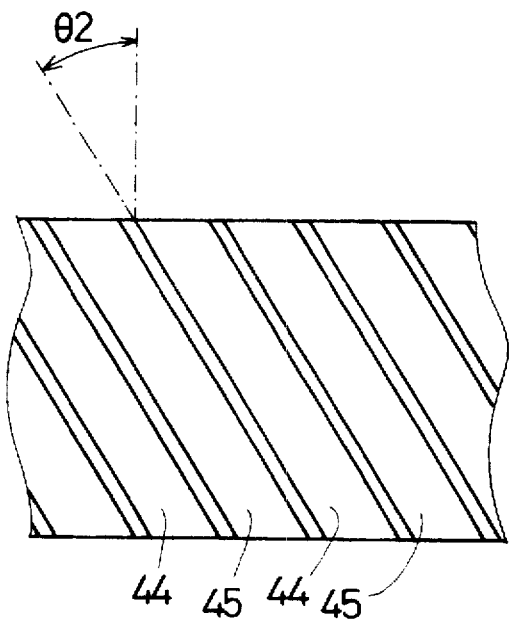
Figure 15:
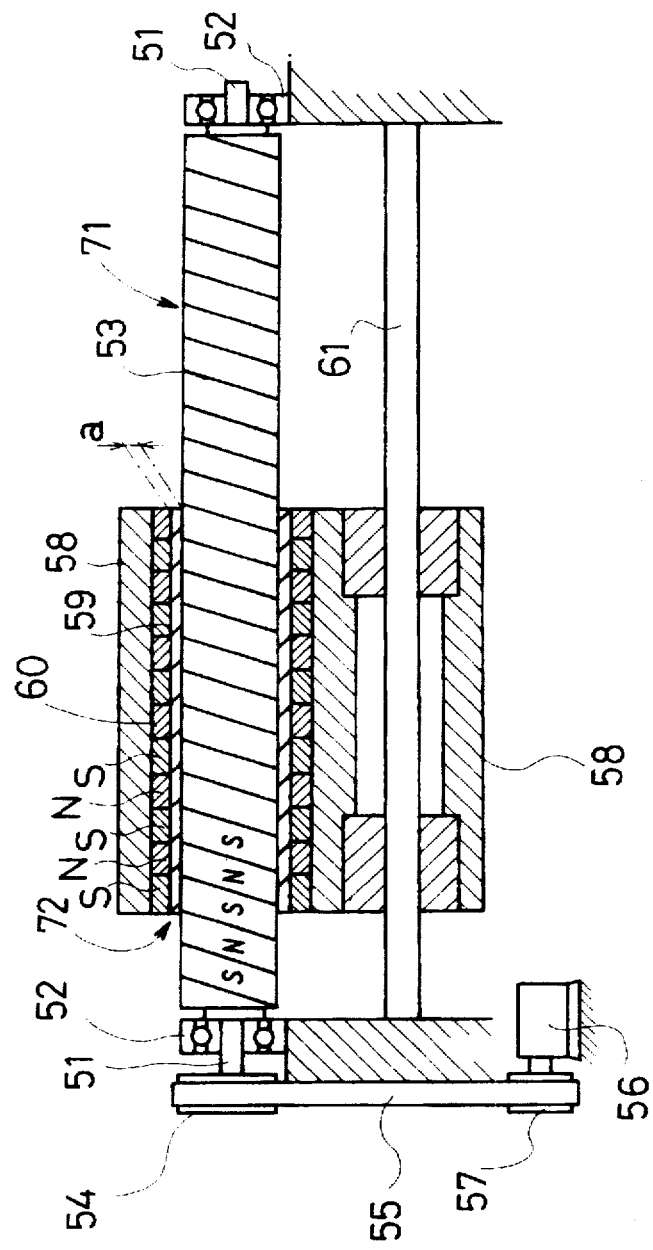
FIG. 15 is a sectional view of a magnetic screw conveying apparatus in the prior art.

In detail, one of the double magnetized bands is constructed of first magnetized bands 42 with a south pole S and first magnetized bands 43 with a north pole N (see FIG. 14(a)), both first magnetized bands 42 and 43 being arranged alternately on the outer periphery of the rotary shaft 11 in a parallel spiral form at a first inclination angle $\theta 1$, and another is constructed of second magnetized bands 44 with a south pole S and second magnetized band 45 with a north pole N (see FIG. 14(b)), both second magnetized bands 44 and 45 being arranged alternately and in a parallel spiral form at a second inclination angle $\theta 2$. The second magnetized bands 44 and 45 are provided so as to superpose on the first magnetized bands 42 and 43 (FIG. 13).

Thus, the male magnetic screw 41 is substantially constructed of double magnetic screws, one having the first inclination angle $\theta 1$ and another having the second inclination angle $\theta 2$.

With the above construction of the double male magnetic screw 41, when the rotary shaft 11 is rotated by the stepmotor 19, the first female magnetic screw 27 receives the magnetic force from the magnetized bands having the first inclination angle $\theta 1$ of the double male magnetic screw 41, and at the same time the second female magnetic screw 28 receives the magnetic force from the magnetized bands having the second inclination angle $\theta 2$ of the same, thereby allowing the first and second slide tables 21 and 22 to move at different speeds.

At this time, the first female magnetic screw 27 is also influenced by the magnetized bands having the second inclination angle $\theta 2$ of the double male magnetic screw 41, and the second male magnetic screw 28 is also influenced by the magnetized bands having the first inclination angle $\theta 1$ of the same. This accordingly causes the reduction in magnetic force that the first and second female magnetic screws 27 and 28 receive naturally from the double male magnetic screw 41. As a result, it appears inappropriate for the case of needing a high transmitting force, whereas it is possible to built a compact conveying apparatus in case of conveying objects having light weight.

Next, in a fourth embodiment according to the present invention, a chuck apparatus which the above magnetic screw according to the present invention is applied to will be explained.

Figure 16:
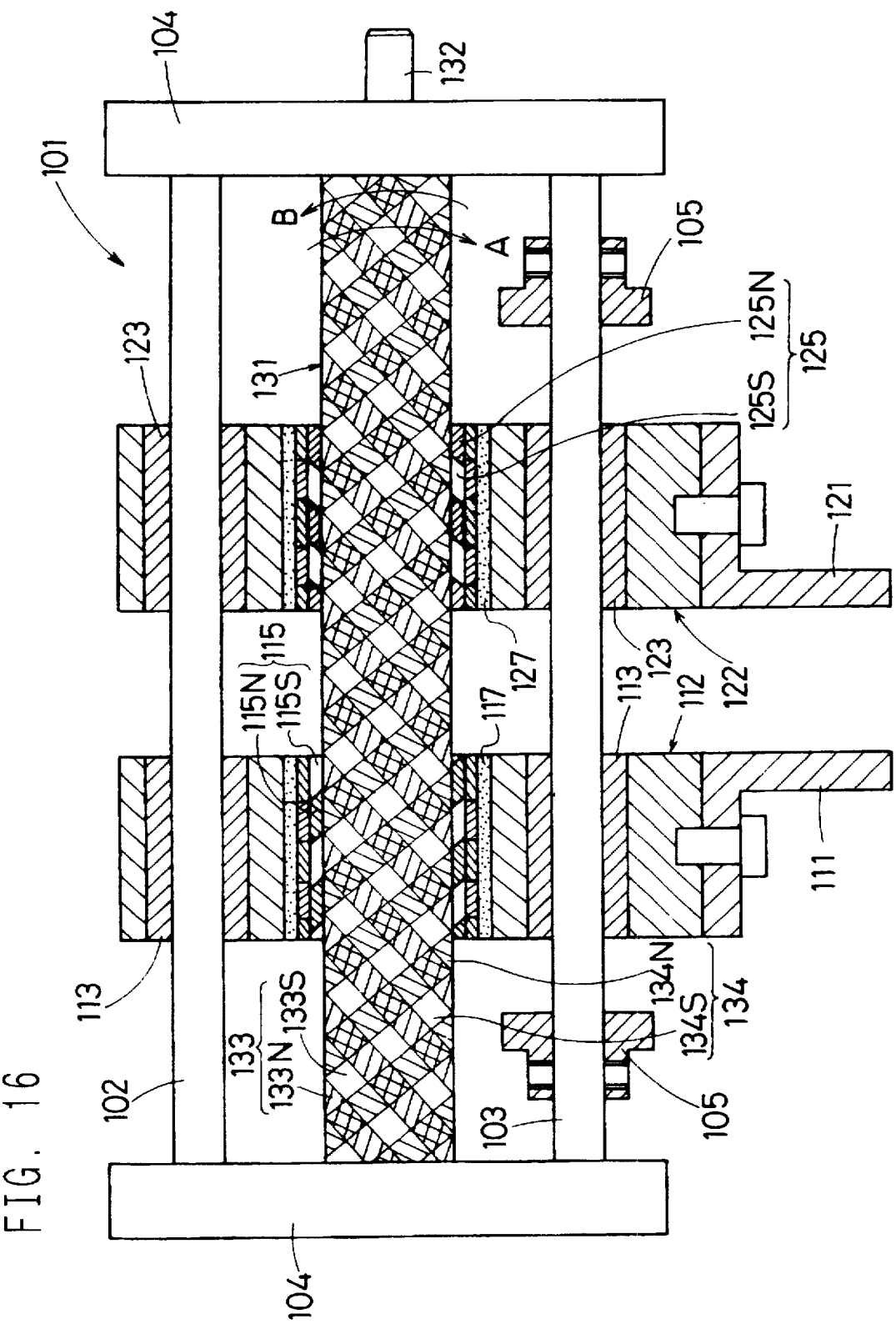
FIG. 16 is a sectional view of a magnetic screw chuck device in a fourth embodiment according to the present invention.

A magnetic screw chuck apparatus 101 comprises, as shown in FIG. 16, chuck claws 111, 121 consisting of plate material each having a cross section in L-shape as shown in the drawing, each of which is fastened on a first movable carriage 112 or a second movable carriage 122. These first and second movable carriages 112 and 122 are mounted on two guide bars 102 and 103 fixedly mounted at their both ends on blocks 104 and 104 so as to be arranged horizontally. The first and second movable carriage 112 and 122 are thus supported so as to be slidable in an axis direction. Specifically, the first and second movable carriage 112 and 122 are fitted on the guide bars 102 and 103 respectively by solid bearings 113, 113, 123, and 123. On the guide bar 103, stoppers 105 and 105 are fixedly mounted with screws so as to be changeable their positions to restrict the movement of the first and second movable carriage 112 and 122 respectively.

A driving shaft 131 arranged horizontally between the guide bars 102 and 103 is constructed of a shaft member 132 rotatably supported at its both ends on bearings and a cylindrical magnet provided on the outer periphery of the shaft member 132.

A first male magnetic screw 133 is formed on the outer surface of the cylindrical magnet so that a magnetized band 133 N with a north pole N and a magnetized band 133S with a south pole S are winded alternately arranged in a spiral form at an upper rightward slant in the drawing. Over the first male magnetic screw 133, formed is a second male magnetic screw 134 having a magnetized band 134N with a north pole N and a magnetized band 134S with a south pole S which are alternately arranged in a spiral form at a lower rightward slant in the drawing.

As shown in FIG. 16, in the first and second movable carriage 112 and 122, each portion into which the driving shaft 131 is inserted is provided with a cylindrical magnet. This forms a first and second female magnetic screws 115 and 125 with a clearance with respect to the male magnetic screws 133 and 134.

The first female magnetic screw 115 is provided with a magnetized band 115N with a north pole N and a magnetized band 115S with a south pole S each having an inclination angle corresponding to that of the magnetized bands of the first male magnetic screw 133. The second female magnetic screw 125 is provided with a magnetized band 125N with a north pole N and a magnetized band 125S with a south pole S each having an inclination angle corresponding to that of the magnetized bands of the second male magnetic screw 134. These first female magnetic screw 115 and the second female magnetic screw 125 are installed in the first and second movable carriages 112 and 122 respectively by cylindrical holders 117 and 127 both slidably fitted in the first and second movable carriage 112 and 122.

The width of the first movable carriage 112 in the axis direction is preferably larger than a lead width of the magnetized bands of the male magnetic screws 133 and 134. This is to prevent unsmooth movement of the first movable carriage 112 owing to the disorder of magnetized bands possibly caused by that the first and second male magnetic screws 133 and 134 are magnetized so as to overlap.

Operation of the magnetic chuck apparatus 101 constructed as above will be explained hereinafter.

In a state where the chuck claws 111 and 121 are opened, namely, where the first and second movable carriages 112 and 122 are separated from each other, the magnetic force generating between the first male magnetic screw 133 and the first female magnetic screw 115 makes the first movable carriage 112 be at rest at a position where magnetized bands with opposite poles of both magnetic screws are facing each other. The magnetic force between the second male magnetic screw 134 and the second female magnetic screw 125 makes the second movable carriage 122 at rest at a position where magnetized bands with opposite poles of both magnetic screws are facing each other. In this state, the chuck claws 111 and 121 are retained as separated.

The driving shaft 131 is then made to rotate in a direction indicated by an arrow A by the driving of a motor.

When the first male magnetic screw 133 provided on the driving shaft 131 is thus rotated, the magnetized bands 133N and 133S show the motion just like a spiral advance. With that spiral advance, the magnetized bands 115N and 115S of the first female magnetic screw 115 of the first movable carriage 112 intend to follow, whereas the carriage 112 is prevented to rotate. The first movable carriage 112 is accordingly allowed to move rightward in the drawing along the guide bars 102 and 103.

Simultaneously, when the second male magnetic screw 134 provided on the driving shaft 131 is rotated, the magnetized bands 134N and 134S show the motion just like a spiral advance. With that spiral advance, the magnetized bands 125N and 125S of the second female magnetic screw 125 of the second movable carriage 122 intend to follow, whereas the carriage 122 is prevented to rotate. The second movable carriage 122 accordingly is allowed to move leftward in the drawing along the guide bars 102 and 103.

In this way, the first and second movable carriages 112 and 122 are moved by the rotation of the driving shaft 131 until the chuck claws 111 and 121 of the first and second movable carriages 112 and 122 meet an object arranged between the chuck claws 111 and 121 and then clamp it while applying a constant pressure thereto. In detail, the driving shaft 131 is continuously rotated after the chuck claws 111 and 121 come into contact with the object, and overruns a predetermined angle and stops there. Adjusting the angle makes it possible to regulate thrust of the chuck claws 111 and 122 to clamp an object accordingly.

As mentioned above, the first male magnetic screw 133 and the first female magnetic screw 115 are combined with each other only by magnetic force therebetween as well as the second male magnetic screw 134 and the second female magnetic screw 125, so that, when the chuck claws 111 and 121 come into contact with an object, the shock of contact can be absorbed in the magnetic screw section. This prevents an over load to be applied on the driving system and thus the occurrence of damage to the driving system. It is also possible to prevent excessive clamping which may cause damage to an object.

The present invention may be embodied in other specific forms without departing from the spirit or essential characteristics thereof.

For instance, although the use of mainly two slide tables is described in the above embodiments, similar effect can be obtained also in other cases of using three or more slide tables.

In the magnetized bands, actually, magnetic force is strong at the center portion and weak at the end portion.

However, there is no problem in case of simply aiming at conveying objects.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A magnetic screw conveying apparatus comprising:

a rotary shaft rotatable supported;

driving means for driving said rotary shaft to rotate;

a double male magnetic screw having first spiral magnetized bands with a south pole S and a north pole N alternately magnetized at a first inclination angle on said rotary shaft and second magnetized bands with a south pole S and a north pole N alternately magnetized at a second inclination angle on the same rotary shaft;

a first slide table slidably mounted on said rotary shaft;

a first female magnetic screw having magnetized bands with a south pole S and a north pole N alternately magnetized in a spiral form at a first inclination angle on an inner periphery surface of said first slide table, opposite to said male magnetic screw;

a second slide table slidably mounted on said rotary shaft; and a second female magnetic screw having magnetized bands with a south pole S and a north pole N alternately magnetized in a spiral form at a second inclination angle on an inner periphery surface of said second slide table, opposite to said male magnetic screw;

wherein, with the rotation of said rotary shaft by said driving means, said first and second female magnetic screws receive magnetic force from said male magnetic screw respectively, thereby allowing said first and second slide tables to move at different speeds.

2. A magnetic screw conveying apparatus according to claim 1, wherein said first inclination angle of said first female magnetic screw and said second inclination angle of said second female magnetic screw are set in different directions with respect to the circumference; said first and second inclination angles of said double male magnetic screw are set in different directions with respect to the circumference;

said first and second slide tables move in opposite directions when the rotary shaft is rotated.

3. A magnetic screw conveying apparatus comprising:

a rotary shaft rotatable supported;

driving means for driving said rotary shaft to rotate;

a male magnetic screw having magnetized bands with a south pole S and a north pole N alternately magnetized and in parallel to each other on the outer periphery of said rotary shaft;

a first slide table slidably mounted on said rotary shaft;

a first female magnetic screw having magnetized bands with a south pole S and a north pole N alternately magnetized in a spiral form at a first inclination angle on an inner periphery surface of said first slide table, opposite to said male magnetic screw;

a second slide table slidably mounted on said rotary shaft;

a second female magnetic screw having magnetized bands with a south pole S and a north pole N alternately magnetized in a spiral form at a second inclination angle on an inner periphery surface of said second slide table, opposite to said male magnetic screw; and a pair of chuck claws one of which is fixed on said first slide table and the other is fixed on said second slide table;

wherein said first and second inclination angles are inclined in different directions, and with the rotation of said rotary shaft by said driving means, said first and second female magnetic screws receive magnetic force from said male magnetic screw respectively, and thus said first and second slide tables move in opposite directions when the rotary shaft is rotated.

4. A magnetic screw conveying apparatus according to claim 3, wherein when said pair of chuck claws come into contact with an object to be clamped, said rotary shaft is further rotated by a predetermined angle to provide clamping force to said chuck claws.

5. A magnetic screw chuck apparatus comprising:

a rotary shaft rotatably supported;

driving means for driving said rotary shaft to rotate;

a male magnetic screw having magnetized bands with a south pole S and a north pole N alternately magnetized and in parallel to each other on the outer periphery of said rotary shaft;

a first movable carriage slidably mounted on said rotary shaft;

a first female magnetic screw having magnetized bands with a south pole S and a north pole N alternately magnetized in a spiral form at a first inclination angle on an inner periphery surface of said first movable carriage, opposite to said male magnetic screw;

a second movable carriage slidably mounted on said rotary shaft;

a second female magnetic screw having magnetized bands with a south pole S and a north pole N alternately magnetized in a spiral form at a second inclination angle on an inner periphery surface of said second movable carriage, opposite to said male magnetic screw; and a pair of chuck claws one of which is fixed on said first movable carriage and another is fixed on said second movable carriage, wherein, with the rotation of said rotary shaft by said driving means, said first and second female magnetic screws receive magnetic force from said male magnetic screw respectively, thereby allowing said first and second movable carriages to move at different speeds, and said first and second inclination angles are set in different directions with respect to a circumference, and thus said first and second movable carriages move in opposite directions when the rotary shaft is rotated.

6. A magnetic screw chuck apparatus according to claim 5, wherein when said pair of chuck claws come into contact with an object to be clamped, said rotary shaft is further rotated by a predetermined angle to provide clamping force to said chuck claws.

7. A magnetic screw conveying apparatus according to claim 1, wherein the first inclination angle of the double male magnetic screw and the first inclination angle of the first female magnetic screw are substantially the same, and the second inclination angle of the double male magnetic screw and the second inclination angle of the second female magnetic screw are substantially the same.

8. A magnetic screw conveying apparatus according to claim 7, wherein both the first and second inclination angles are substantially the same but inclined in different directions, and said first and second slide tables move in opposite directions at substantially the same speeds.

* * * * *